Dec. 12, 1961 D. J. RICE 3,013,243

TELEVISION ANTENNA TERMINAL CLIP

Filed Sept. 11, 1959

INVENTOR.
DONALD J. RICE
BY
McMorrow, Berman & Davidson
ATTORNEYS

United States Patent Office 3,013,243

Patented Dec. 12, 1961

3,013,243

TELEVISION ANTENNA TERMINAL CLIP

Donald J. Rice, 1413 Robinwood Drive, Aurora, Ill.

Filed Sept. 11, 1959, Ser. No. 839,456

3 Claims. (Cl. 339—150)

This invention relates to electrical connectors, and more particularly to a terminal clip device for attaching the conductors of a television antenna lead-in cable to the input terminals of a television receiver.

A main object of the invention is to provide a novel and improved terminal clip device for connecting the conductors of a television lead-in cable to the input terminals of a television receiver, the device being simple in construction, being easy to install on a television receiver, and enabling the lead-in conductors from the television antenna to be quickly and easily connected to the input conductors of the television receiver without requiring the use of any tools and with a minimum amount of effort.

A further object of the invention is to provide an improved terminal clip device for connecting the conductors of a television antenna lead-in cable to a television receiver, the clip device being inexpensive to manufacture, being compact in size, being inconspicuous in appearance, and providing a reliable and secure electrical connection between the television antenna lead-in conductors and the input terminals of a television receiver.

A still further object of the invention is to provide an improved terminal clip for use with a television receiver in order to detachably connect the input terminals of the receiver to the lead-in conductors of a television antenna, the terminal clip device being arranged so that the lead-in conductor wires may be easily and quickly disconnected from the television receiver, for example, during electrical storms, or under other circumstances wherein it is desired to disconnect the antenna from the receiver, such as when the receiver is to be moved from one louation to another.

Further objects and advantages of the invention will become apparent from the following description and claims, and from the accompanying drawings, wherein:

Figures 1, 2, 3, 4, 5, 6, 7, 8:
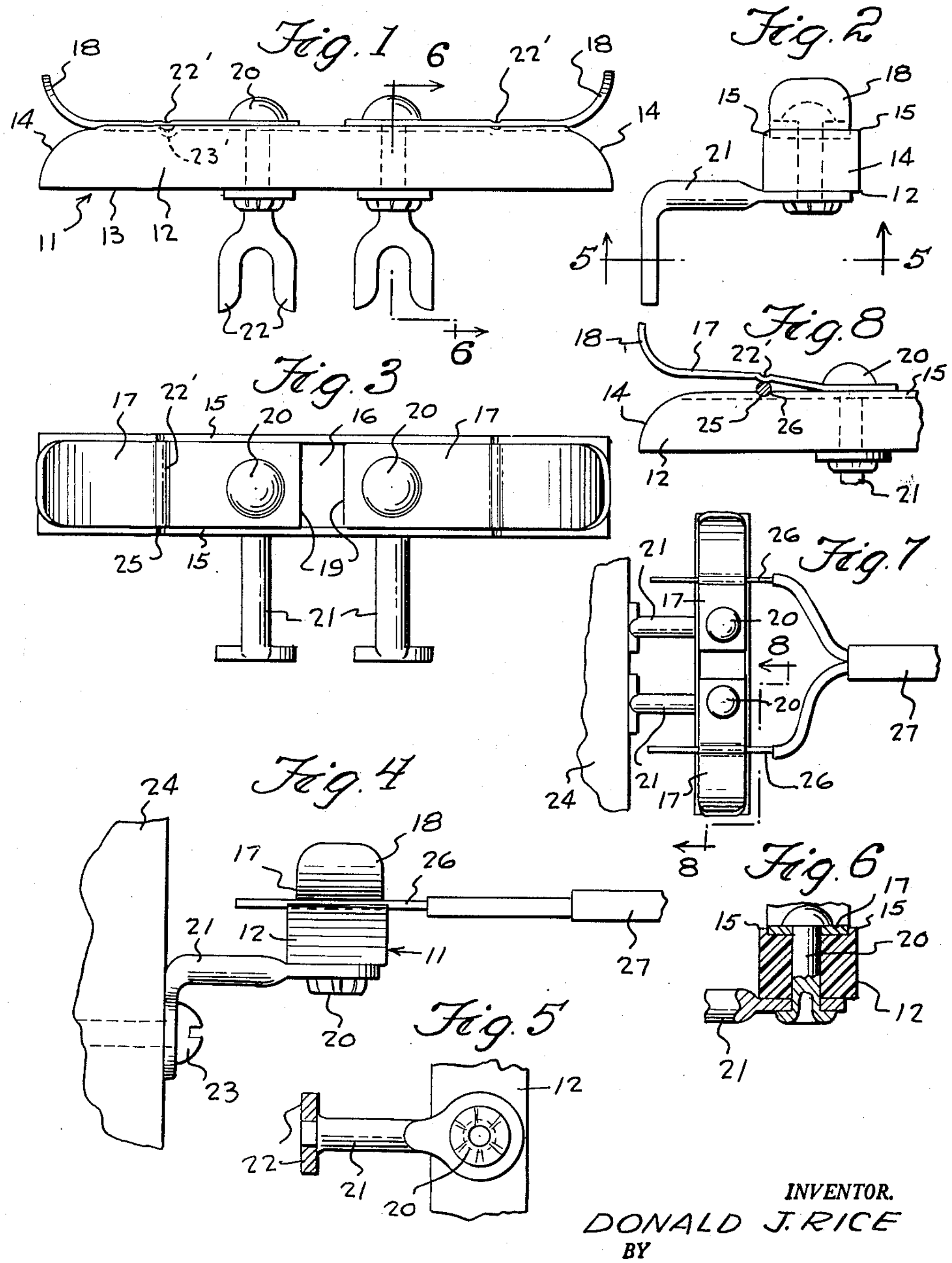
FIGURE 1 is an elevational view of an improved antenna terminal clip device constructed in accordance with the present invention.
FIGURE 2 is an end elevational view of the terminal clip device of FIGURE 1.
FIGURE 3 is a top plan view of the terminal clip device of FIGURES 1 and 2.
FIGURE 4 is an end elevational view of the clip device, showing the manner in which the clip device is secured to a television receiver and the manner in which the antenna lead-in wire ends are connected to the terminal conductors of the clip device.
FIGURE 5 is a horizontal cross sectional view taken substantially on the line 5—5 of FIGURE 2.
FIGURE 6 is a transverse vertical cross sectional view taken substantially on the line 6—6 of FIGURE 1.
FIGURE 7 is a top view, to a reduced scale, showing the manner in which the two lead-in conductors of a television antenna are engaged with the terminal conductors of the clip device, whereby to connect the antenna lead-in conductors to the television input terminals.
FIGURE 8 is an enlarged cross sectional detail view taken on the line 8—8 of FIGURE 7.

Referring to the drawings, 11 generally designates an improved television antenna terminal clip device according to the present invention. The clip device 11 comprises an elongated body 12 of insulating material having a flat bottom surface 13 and having rounded top corners 14, 14. The top surface of the body 13 is formed with the raised ribs or flanges 15, 15 extending longitudinally along the sides of the body, whereby to define a longitudinal recess or groove 16 between the longitudinal marginal ribs 15, 15. Designated respectively at 17, 17 are a pair of longitudinally extending spring conductors of suitable resilient metal, such as hardened copper or spring brass which are shaped to fit between the ribs 15, 15 and which are formed at their outer ends with the upturned portions 18, 18, said portions 18, 18 being arcuately curved upwardly and being located above the respective arcuately curved end portions 14, 14 of the body 12, as is clearly shown in FIGURE 1. The conductor members 17, 17 are spaced apart at their inner ends, as shown at 19, 19, and are secured to the body 12 adjacent said inner ends by respective rivets 20, 20 extending vertically through the body 12. Also secured to the body at its under side by the rivets 20, 20 are respective right angled spade lugs 21, 21, the spaced finger portions 22, 22 of said lugs extending vertically and being spaced to engage on respective antenna terminals 23, 23 of a television receiver 24.

The spade lugs 21, 21 are preferably rotatable around the axes of the rivets 20, 20 to a degree sufficient to compensate for variations in spacing between the terminal lugs 23, 23 on different models of television receivers.

As shown in FIGURE 4, the right angled spade lugs 21 engage with the terminal screws 23, and when the screws 23 are tightened, the clip device 11 is thus rigidly supported in a position located outwardly adjacent the terminal screws 23, 23. If the terminal screws are horizontally spaced, the body 12 will thus be supported in a horizontal position adjacent the television receiver 24. Similarly, if the terminals 23, 23 are vertically spaced, the body 12 is supported in a vertical position.

The resilient conductor members 17, 17 are preferably formed with transversely extending depending corrugations 22', 22' located at their intermediate portions, namely, between the rivets 20 and the curved outer ends 18 of the members, and the top surface of body 12 is formed between the longitudinal ribs 15, 15 with correspondingly located transverse grooves 23', the transverse grooves 23' being located to receive the corrugations 22' therein.

The ribs 15 are correspondingly notched, as shown at 25, the notches 25 being in alignment with the depending corrugations 22', whereby to lockingly interengage with a terminal conductor wire 26 in a manner presently to be described.

In connecting the terminal wires 26, 26 of a television antenna lead-in cable 27 to the television receiver, it is merely necessary to force the wire ends 26 inwardly between the curved outer ends 18 of the resilient conductors 17 and the curved outer ends 14 of the insulating body 12, the wire ends 26 lockingly engaging in the notches 25 and the transverse grooves 23' and being secured therein by the depending transverse corrugations 22' of the resilient conductors 17, 17. Thus, the wire ends 26 are electrically connected through the conductors 17 and the spade lugs 21 to the antenna terminals 23 of the television receiver and are securely supported and gripped by the spring conductors 17, 17 so that they will not loosen or become disengaged from the terminal clip device unless substantial manual force is applied thereto. To disconnect the wire ends 26 from the clip device, it is merely necessary to exert manual force on the lead-in cable 27, pulling the cable outwardly away from the clip device, whereby the wire ends 26, 26 may be pulled from beneath the resilient spring clip members 17, 17.

As will be readily apparent, the wire ends 26, 26 may be connected to the clip device without requiring the use of any tools and in a simple and rapid manner. Also it is relatively easy to disconnect the antenna lead-in cable

27 from the receiver, since this may be accomplished by merely pulling on the cable 27 in the manner above described.

While a specific embodiment of an improved television antenna lead-in connection clip device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A television antenna terminal clip assembly comprising an elongated insulating body, a pair of rigid spaced supporting terminals supportingly engaging the under side of said body and being spaced to be secured to the antenna terminals of a television receiver, said body being formed in its top surface with a longitudinal groove, a pair of longitudinally aligned, outwardly directed spaced resilient clip members seated in said groove and being retained thereby in aligned positions extending longitudinally on the top surface of said body, and conductive fastening means extending through the inner end portions of said clip members, said body, and said rigid supporting terminals and electrically connecting said clip members to the supporting terminals, the outer free end portions of said clip members being curved upwardly and outwardly, and said clip members being constructed and arranged to receive the ends of a pair of antenna lead-in wires transversely therebeneath and to clampingly secure the lead-in wires to said body.

2. A television antenna terminal clip assembly comprising an elongated insulating body, a pair of rigid spaced terminals supportingly engaging the under side of said body and being spaced to be secured to the antenna terminals of a television receiver, upstanding ribs on the longitudinal margins of said body, a pair of spaced elongated resilient clip members seated between said ribs and being retained thereby in positions extending longitudinally on the top surface of said body, and conductive fastening means extending through the inner end portions of said clip members, said body and said rigid supporting terminals and electrically connecting said clip members to the supporting terminals, the outer free end portions of said clip members being inclined upwardly and outwardly, and said clip members being constructed and arranged to receive the ends of a pair of antenna lead-in wires transversely therebeneath and to clampingly secure the lead-in wires to said body.

3. A television antenna terminal clip assembly comprising an elongated insulating body, a pair of rigid spaced supporting terminals supportingly engaging the under side of said body and being spaced to be secured to the antenna terminals of a television receiver, upstanding ribs on the longitudinal margins of said body, a pair of spaced elongated resilient clip members seated between said ribs and being retained thereby in positions extending longitudinally on the top surface of said body, said body being formed with transverse locking grooves between said ribs, and said ribs being formed with notches substantially in registry with said grooves, and conductive fastening means extending through the inner end portions of said clip members, said body and said rigid supporting terminals and electrically connecting the clip members to the supporting terminals, the outer end portions of said clip members being inclined upwardly and outwardly and being constructed and arranged to receive the ends of a pair of antenna lead-in wires therebeneath and being formed with depending transverse corrugations upwardly adjacent said notches and locking grooves to clampingly secure the lead-in wires in said notches and transverse locking grooves.

References Cited in the file of this patent

UNITED STATES PATENTS

| | | |
|---|---|---|
| 1,564,761 | Daiker | Dec. 8, 1925 |
| 1,634,065 | Barnay | June 28, 1927 |
| 2,125,256 | Fairbanks | July 26, 1938 |
| 2,458,511 | Harlow | Jan. 11, 1949 |
| 2,566,425 | Paine et al. | Sept. 4, 1951 |
| 2,580,682 | Kraft et al. | Jan. 1, 1952 |
| 2,753,535 | Miller et al. | July 3, 1956 |

FOREIGN PATENTS

| | | |
|---|---|---|
| 217,141 | Great Britain | June 12, 1924 |